United States Patent
Meguro et al.

[11] 3,876,634
[45] Apr. 8, 1975

[54] BENDODIAZEPINE DERIVATIVES

[75] Inventors: Kanji Meguro, Takarazuka, Hyogo; Hiroyuki Tawada, Kyoto; Yutaka Kuwada, Ashiya, Hyogo, all of Japan

[73] Assignee: Takeda Chemical Industries, Ltd., Osaka, Japan

[22] Filed: Oct. 12, 1973

[21] Appl. No.: 406,172

Related U.S. Application Data

[63] Continuation of Ser. No. 189,023, Oct. 13, 1971, abandoned.

[52] U.S. Cl. 260/244 R; 260/256.4 F; 260/256.4 Q; 260/307 F; 260/308 A; 424/248; 424/251; 424/269; 424/272
[51] Int. Cl. .......................................... C07d 55/06
[58] Field of Search ......... 260/244, 256.4, 307, 308

[56]  References Cited
UNITED STATES PATENTS
3,755,300    8/1973    Tachikawa et al.............. 260/244

*Primary Examiner*—Harry I. Moatz
*Attorney, Agent, or Firm*—Wenderoth, Lind & Ponack

[57]  ABSTRACT

Compounds of the formula

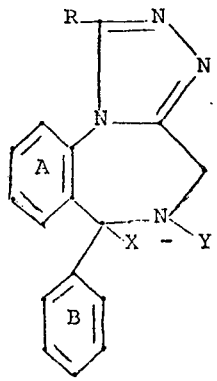

where R is hydrogen or lower alkyl, X is O or NH, Y is unsubstituted or substituted ethylene or trimethylene and rings A and B may be substituted are useful as tranquilizers. Also provided are novel starting materials of the formula

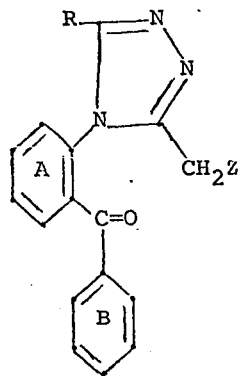

where Z is halogen.

17 Claims, No Drawings

BENDODIAZEPINE DERIVATIVES

This application is a continuation of Ser. No. 189,023, filed Oct. 13, 1971 now abandoned.

The present invention relates to novel benzodiazepine derivatives of the following general formula:

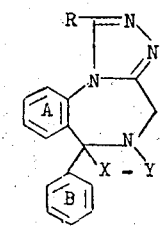
(I)

(wherein R is hydrogen or a lower alkyl group, X is —O— or —NH—, Y is an ethylene or trimethylene group which may be unsubstituted or substituted by a lower alkyl group, and the ring A and/or B may be unsubstituted or substituted by halogen, nitro, trifluoromethyl, alkyl or alkoxy group) and their pharmaceutically acceptable salts.

The present inventors have made extensive studies about a series of benzodiazepine derivatives and succeeded in synthesizing the novel derivatives of the above formula (I), and have found that the above benzodiazepine derivatives have an effective tranquilizing effect, etc.

The present invention has been accomplished on the basis of this finding.

The principal object of this invention is to provide novel benzodiazepine derivatives useful as a tranquilizer, etc. Another object of this invention is to provide a method for the production of these novel compounds. Further objects will become apparent from the description of this specification as well as of the claims.

The following is a detail explanation of this invention.

The benzodiazepine derivatives of the above general formula (I) and their pharmaceutically acceptable salts show a tranquilizing effect, a muscle relaxing effect, an anticonvulsive effect, a sedative effect, a sleep-inducing effect, etc., and furthermore, these compounds show very low toxicity and substantially no or negligible side effect. Taking advantage of these excellent properties, these compounds can be safely used as tranquilizers, muscle relaxants, sedatives, anticonvulsants, sleep inducers, etc.

In the above formula (I), the symbol R is a hydrogen atom or a lower alkyl group, which is preferably one having 1 to 3 carbon atoms, such as methyl, ethyl, n-propyl and isopropyl, and X is an —O— or —NH—. Y is ethylene or trimethylene group. The ethylene or trimethylene group may contain at an optional position a lower alkyl, which preferably has 1 to 3 carbon atoms, such as methyl, ethyl, n-propyl and isopropyl. The ring A and/or B may contain, at an optional position or positions, a substitutent or substituents selected from the group consisting of halogen (e.g., chlorine, bromine, fluorine, iodine), nitro, trifluoromethyl, alkyl (e.g., lower alkyl of 1 to 3 carbon atoms, such as methyl, ethyl, propyl, isopropyl) and alkoxy (e.g., lower alkoxy of 1 to 3 carbon atoms, such as methoxy, ethoxy, propoxy, isopropoxy).

The pharmaceutically acceptable salts of the compounds (I) are exemplified by inorganic salts such as hydrochloride, sulfate and hydrobromide, and organic salts such as acetate, oxalate, malonate, succinate, tartarate, malate, fumarate and palmitate.

The object compound of this invention is prepared by reacting a compound of the general formula

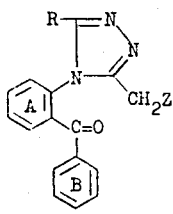
(II)

(wherein R and rings A and B have the same meaning as defined above, and Z is halogen atom such as chlorine, bromine and iodine) with a compound of the general formula $$HX-Y-NH_2$$
(III)

(wherein X and Y have the same meaning as defined above).

The reaction is conducted in the presence of a solvent such as alcohols (e.g., methanol, ethanol, propanol, isopropanol, n-butanol, sec-butanol, t-butanol, amyl alcohol, ethylene glycol), chloroform, dichloromethane, benzene, toluene, xylene, pyridine and dimethylformamide.

The reaction temperature is within a range between room temperature and about 150°C, and is desirably the boiling point of the solvent used. An amount of the compound (III) to be used is about 1 to about 10 mole parts per mole part of the compound (II).

A basic substance such as organic amines (e.g., pyridine, triethylamine) and alkali salts of organic acid (e.g., sodium acetate, potassium acetate) can be used in the reaction so as to find hydrogen halide which is generated during the reaction.

When the compound (II) wherein Z is chlorine or bromine is used, it is sometimes recommended that an alkali metal iodide such as sodium iodide and potassium iodide is added to the reaction system, whereby the desired reaction may be accelerated It is presumed that the above reaction proceeds through an intermediate of the formula

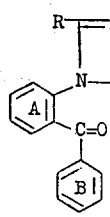
(IV)

(wherein all the symbols have the same meaning as defined above).

In the present method, it is not necessary to separate out the above intermediate, but if desired it is possible to isolate the intermediate by conducting the reaction under mild conditions, for example, by conducting the reaction at room temperature or under heating for a short period of time.

Thus resulting object compound can be recovered after a conventional manner such as evaporation of the solvent, extraction with a solvent such as ethyl acetate, chloroform, dichloromethane and ethyl ether. When the compound is recovered as a free base, it may be converted into a suitable salt after a conventional manner.

The object compounds of the present invention and their pharmaceutically acceptable salts can be used as tranquilizers, muscle relaxants, sedatives, anticonvulsants, sleep inducers, etc.

These compounds as such or in the form of a conventional pharmaceutical composition such as powder, granules, injection solution, etc. together with pharmaceutically acceptable carriers or adjuvants are administered orally or parenterally. The daily dose is about 30 mg/adult human for oral administration and about 0.5 to about 10 mg/adult human for parenteral administration.

The starting material of this invention (compound (II)) is a novel compound prepared by the present inventors and can be produced by the following steps;

hydride derived from a haloacetic acid of the general formula of $ZCH_2COOH$ at about 0°C to about 100°C in the presence of a solvent (e.g. chloroform, dichloromethane, ethyl ether, benzene, dimethylformamide, pyridine, acetic acid, monochloroacetic acid and if desired in the presence of an acid acceptor (e.g., sodium bicarbonate, sodium carbonate, potassium carbonate, potassium bicarbonate, pyridine, triethylamine, imidazole, 2-methylimidazole), whereby there is produced the corresponding haloacetyl derivative of the compound (3) whose chemical structure is not yet precisely clarified. The haloacetyl derivative is then treated with a weak acid such as aliphatic carboxylic acids (e.g., formic acid, acetic acid, monochloroacetic acid, dichloroacetic acid, propionic acid, butyric acid), aromatic carboxylic acids (e.g., benzoic acid, salicylic acid) and aromato-aliphatic carboxylic acids (e.g., phenylacetic acid), if necessary, in the presence of a solvent such as chloroform, dichloromethane, benzene and toluene at room temperature or under heating up to about 150°C.

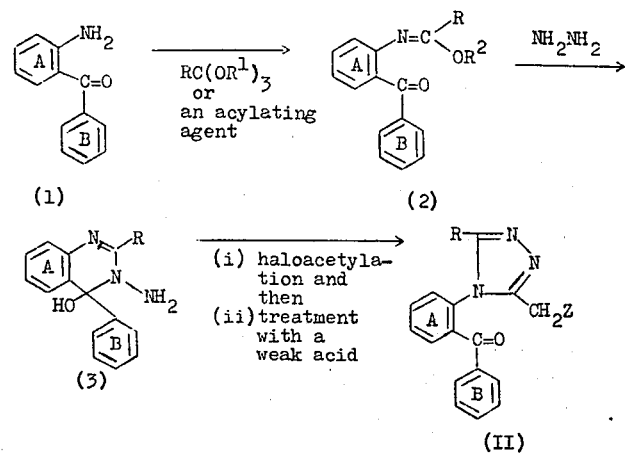

(wherein R, Z and the rings A and B have the same meaning as defined above, $R^1$ is a lower alkyl group such as methyl, ethyl and propyl and $R^2$ is hydrogen or the group $R^1$).

One mole part of the compound (1) is reacted with about 1 to 10 mole parts of an orthoester of the formula $RC(OR^1)_3$ or an acylating agent (e.g., formic acid, acetic acid, acid halides or acid anhydrides derived from an acid of the formula RCOOH). The reaction with the orthoester is generally conducted under heating at about 50° to about 160°C in the presence of a solvent (e.g., toluene, benzene) and an acid catalyst (e.g., inorganic acids such as hydrochloric acid, sulfuric acid, and organic acids such as acetic acid, propionic acid, p-toluenesulfonic acid). The reaction with the acylating agent is easily effected by per se conventional means.

One mole part of the resulting compound (2) is reacted with about 1 to about 5 mole parts of hydrazine in the presence of a solvent (e.g., methanol, ethanol, propanol, isopropanol) and, if necessary, a catalyst (e.g., organic or inorganic acids such as hydrochloric acid, sulfuric acid, acetic acid, propionic acid and p-toluenesulfonic acid) at room temperature or under heating up to the boiling point of the solvent used.

The resulting compound (3) is, at first, subjected to haloacetylation by the use of an acid halide or acid anhydride derived from a haloacetic acid of the general Thus the compound (II) is obtained.

In the present specification, positions of the substituents are designated according to the following numbering of the ring system;

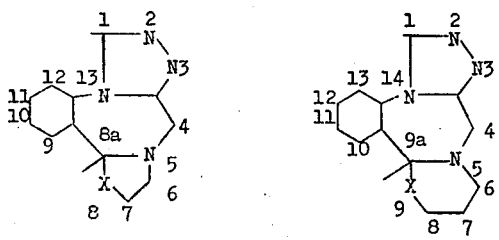

In the following examples and reference, "part(s)" is on the basis of weight unless otherwise stated, and the relationship between "part by weight" and "part by volume" is the same as between "gram" and "milliliter."

EXAMPLE 1

A solution of 3.7 parts of 5-chloro-2-(3-chloromethyl-s-triazol-4-yl) benzophenone hydrochloride and 3 parts by volume of monoethanolamine in 30 parts by volume of ethanol is refluxed for about 4 hours. Evaporation of the solvent gives crystals, which are collected and recrystallized from chloroform-methanol. This procedure gives 10-chloro-8a-phenyl-4,6,7,8a-tetrahydrooxazolo[3,2-d]-s-triazolo[4,3-a][1,4]benzodiazepine as colorless needles or pillars melting at 255° to 256°C.

Elementary analysis for $C_{18}H_{15}ClN_4O$
Calculated: C 63.81, H 4.46, N 16.54
Found: C 63.74, H 4.33, N 16.46

EXAMPLE 2

Various object compounds of the present invention are produced after a similar manner to Example 1. Result is listed as follows;

10-chloro-1-ethyl-7-methyl-8a-phenyl-4,6,7,8a-tetrahydrooxazolo[3,2-d]-s-triazolo[4,3-a][1,4]benzodiazepine
1-ethyl-10-nitro-8a-phenyl-4,6,7,8a-tetrahydrooxazolo-[3,2-d]-s-triazolo[4,3-a][1,4]benzodiazepine
10-chloro-1-ethyl-8a-phenyl-4,6,7,8a-tetrahydro-8H-imidazo[1,2-d]-s-triazolo[4,3-a][1,4]benzodiazepine
11-chloro-1-ethyl-9a-phenyl-4,6,7,9a-tetrahydro-8H-oxazino[3,2-d]-s-triazolo[4,3-a][1,4]benzodiazepine
10-chloro-8a-phenyl-1-propyl-4,6,7,8a-tetrahydrooxazolo-[3,2-d]-s-triazolo[4,3-a][1,4]benzodiazepine
10-methoxy-8a-phenyl-4,6,7,8a-tetrahydrooxazolo-[3,2-d]-s-triazolo[4,3-a][1,4]benzodiazepine
10-methoxy-1-methyl-8a-phenyl-4,6,7,8a-tetrahydroox-

Table

| Starting compounds triazolyl benzophenone derivative | amine | Recrystallization solvent | Object compound | Melting point (°C) (Form of crystal) |
|---|---|---|---|---|
| 5-chloro-2-(3-chloromethyl-s-triazol-4-yl)-benzophenone | isopropanolamine | ethyl acetate | 10-chloro-7-methyl-8a-phenyl-4,6,7,8a-tetrahydrooxazolo[3,2-d]-s-triazolo[4,3-a][1,4]-benzodiazepine | 220 to 221°C (colorless pillars) |
| 5-chloro-2-(3-chloromethyl-5-methyl-s-triazol-4-yl)benzophenone | ethanolamine | chloroform-methanol | 10-chloro-1-methyl-8a-phenyl-4,6,7,8a-tetrahydrooxazolo[3,2-d]-s-triazolo[4,3-a][1,4]benzodiazepine | 258 to 261°C (colorless prisms) |
| 5-chloro-2-(3-chloromethyl-5-methyl-s-triazol-4-yl)benzophenone | isopropanolamine | acetone-ethyl acetate | 10-chloro-1,7-dimethyl-8a-phenyl-4,6,7,8a-tetrahydrooxazolo[3,2-d]-s-triazolo[4,3-a][1,4]benzodiazepine | 219 to 221°C (colorless prisms) |
| 5-chloro-2-(3-chloromethyl-5-methyl-s-triazol-4-yl)benzophenone | ethylenediamine | chloroform-methanol | 10-chloro-1-methyl-8a-phenyl-4,6,7,8a-tetrahydro-8H-imidazo[1,2-d]-s-triazolo[4,3-a][1,4]benzodiazepine | 225 to 235°C (colorless plates) |
| 5-chloro-2-(3-chloromethyl-5-methyl-s-triazol-4-yl)benzophenone | propanolamine | methanol | 11-chloro-1-methyl-9a-phenyl-4,6,7,9a-tetrahydro-8H-oxazino[3,2-d]-s-triazolo[4,3-a][1,4]benzodiazepine | 260 to 261°C (colorless prisms) |
| 2-(3-chloromethyl-5-methyl-s-triazol-4-yl)-5-nitrobenzophenone | ethanolamine | ethanol | 1-methyl-10-nitro-8a-phenyl-4,6,7,8a-tetrahydrooxazolo[3,2-d]-s-triazolo[4,3-a][1,4]benzodiazepine | 224 to 225°C (yellow fine needles) |
| 2-(3-chloromethyl-s-triazol-4-yl)-2',5'-dichlorobenzophenone | ethanolamine | methanol | 10-chloro-8a-(2-chlorophenyl)-4,6,7,8a-tetrahydrooxazolo-[3,2-d]-s-triazolo[4,3-a][1,4]-benzodiazepine | 223 to 224°C (colorless needles) |
| 5-chloro-2-(3-chloromethyl-s-triazol-4-yl)-2'-fluorobenzophenone | ethanolamine | ethanol | 10-chloro-8a-(2-fluorophenyl)-4,6,7,8a-tetrahydrooxazolo-[3,2-d]-s-triazolo[4,3-a][1,4]-benzodiazepine | 212 to 213°C (colorless prisms) |
| 5-chloro-2-(3-chloromethyl-s-triazol-4-yl)-4'-methoxybenzophenone | ethanolamine | acetone-n-hexane | 10-chloro-8a-(4-methoxyphenyl)-4,6,7,8a-tetrahydrooxazolo[3,2-d]-s-triazolo[4,3-a][1,4]benzodiazepine | 98 to 100°C (colorless prisms) |
| 2-(3-chloromethyl-s-triazol-4-yl)benzophenone | ethanolamine | ethyl acetate | 8a-phenyl-4,6,7,8a-tetrahydrooxazolo[3,2-d]-s-triazolo-[4,3-a][1,4]benzodiazepine | 163.5 to 164.5°C (colorless prisms) |
| 2-(3-chloromethyl-s-triazol-4-yl)-5-trifluoromethylbenzophenone | ethanolamine | ethanol | 8a-phenyl-10-trifluoromethyl-4,6,7,8a-tetrahydrooxazolo-[3,2-d]-s-triazolo[4,3-a][1,4]-benzodiazepine | 224 to 225°C (colorless prisms) |
| 2-(3-chloromethyl-s-triazol-4-yl)-5-nitrobenzophenone | ethanolamine | methanol | 10-Nitro-8a-phenyl-4,6,7,8a-tetrahydrooxazolo[3,2-d]-s-triazolo[4,3-a][1,4]benzodiazepine | 225 to 226°C (colorless prisms) |
| 2-(3-chloromethyl-1-methyl-s-triazol-4-yl)-5-methylbenzophenone | ethanolamine | chloroform-methanol | 1,10-Dimethyl-8a-phenyl-4,6,7,8a-tetrahydrooxazolo[3,2-d]-s-triazolo[4,3-a][1,4]benzodiazepine | 255 to 256°C (colorless prisms) |

After a similar manner to the above, the following compounds can be prepared;
10-chloro-1-ethyl-8a-phenyl-4,6,7,8a-tetrahydrooxazolo-[3,2-d]-s-triazolo[4,3-a][1,4]benzodiazepine
azolo[3,2-d]-s-triazolo[4,3-a][1,4]benzodiazepine.

Reference (Preparation of the starting triazolyl benzophenone derivative):

1. 34.7 Parts of 2-amino-5-chlorobenzophenone is dissolved in 100 parts by volume of formic acid, followed by heating under reflux for 1.5 hours. Formic acid is removed under reduced pressure, and the residue is dissolved in 300 parts by volume of ethyl/acetate and the solution is washed with saturated sodium bicarbonate solution and then with water, followed by drying. Solvent is removed and the residue is treated with hexane to give 5-chloro-2-formamidobenzophenone as yellow crystals melting at 92.5° to 93°C.

2.7 Parts of thus obtained 5-chloro-2-formamidobenzophenone is dissolved in 40 parts by volume of ethanol. To the solution is added 2.5 parts by volume of hydrazine hydrate (100%), followed by heating under reflux for 20 minutes. The resultant mixture is cooled and the separated crystals are collected, washed with ethanol and then with ether and dried. This procedure gives 3-amino-6-chloro-3,4-dihydro-4-hydroxy-4-phenylquinazoline as crystals melting at 189° to 192°C.

A mixture of 68.4 parts of 3-amino-6-chloro-3,4-dihydro-4-hydroxy-4-phenylquinazoline, 75 parts of anhydrous sodium carbonate, 600 parts by volume of water and 600 parts by volume of chloroform is cooled with a freezing mixture. 60 Parts by volume of chloroacetyl chloride is added thereto dropwise below 10°C in a period of 30 minutes. After stirring for a further 20 minutes, the resulting precipitate is collected by filtration, washed with water and chloroform, and dried to give a compound corresponding to a di-(chloroacetyl) derivative as crystals. Recrystallization from chloroform-methanol gives colorless needles melting at 157°–158°C. Elementary analysis coincides with the value calculated for $C_{18}H_{24}Cl_3N_3O_2$.

A mixture of 12.8 parts of the di-(chloroacetyl) derivative prepared above and 250 parts by volume of acetic acid is refluxed for 1 hour. After distillation of the acetic acid under reduced pressure, a saturated aqueous solution of sodium bicarbonate is added to the residue and the mixture is extracted with ethyl acetate. The ethyl acetate layer is washed with water and dried over sodium sulfate, followed by removal of the solvent by distillation. The residue is dissolved in a mixture of ethanol and ether, and saturated ethanolic hydrogen chloride is added to the solution. The resulting crystals are collected by filtration, washed with ether and a small amount of acetone and dried to give 5-chloro-2-(3-chloromethyl-s-triazol-4-yl)benzophenone hydrochloride. Recrystallization from ethanol-ether gives colorless crystals melting at 176° to 178°C.

Elementary analysis:
Calculated for $C_{16}H_{11}Cl_2N_3O \cdot HCl$
C 52.13, H 3.28, N 11.40
Found C 52.27, H 2.94, N 11.17

The free base of this compound is colorless prisms melting at 144° to 145°C (recrystallized from ethanol)

2. The following compounds are prepared after a similar manner to the above reference:

5-chloro-2-(3-chloromethyl-5-methyl-s-triazol-4-yl)-benzophenone
  melting point : 141 to 142°C
2-(3-chloromethyl-s-triazol-4-yl)-5-nitrobenzophenone
  melting point : 143 to 144°C
2-(3-chloromethyl-5-methyl-s-triazol-4-yl)-5-nitro-benzophenone
  melting point : 210 to 211°C
2-(3-chloromethyl-s-triazol-4-yl)-2',5-dichloro-benzophenone
  melting point : 139 to 140°C
5-chloro-2-(3-chloromethyl-s-triazol-4-yl)-2'-fluoro-benzophenone
  melting point : 118 to 119°C
5-chloro-2-(3-chloromethyl-s-triazol-4-yl)-4'-methoxybenzophenone
  melting point : 126 to 127°C.
2-(3-chloromethyl-s-triazol-4-yl)benzophenone
  melting point : 141.5 to 142.5°C
2-(3-chloromethyl-s-triazol-4-yl)-5-trifluoromethyl-benzophenone
  melting point : 127 to 128°C
2-(3-chloromethyl-1-methyl-s-triazol-4-yl)-5-methyl benzophenone
  melting point : 167° to 168°C

What is claimed is:

1. A compound selected from the group consisting of a compound of the formula

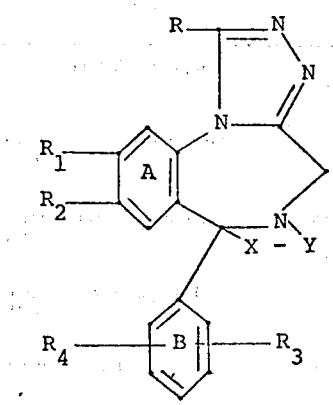

wherein R is hydrogen or lower alkyl, X is O or NH, Y is ethylene or trimethylene which may be unsubstituted or mono substituted by lower alkyl and $R_1$, $R_2$, $R_3$ and $R_4$ are, independently of each other, hydrogen, halogen, nitro, trifluoromethyl, lower alkyl or lower alkoxy, and pharmaceutically acceptable salts thereof.

2. A compound claimed in claim 1, wherein R is hydrogen or alkyl having 1 to 3 carbon atoms.

3. A compound claimed in claim 1, wherein Y is ethylene, propylene or trimethylene.

4. The compound according to claim 1, namely, 10-chloro-8a-phenyl-4,6,7,8a-tetrahydrooxazolo [3,2-d]-s-triazolo [4,3-a][1,4]benzodiazepine.

5. The compound according to claim 1, namely, 10-chloro-7-methyl-8a-phenyl-4,6,7,8a-tetrahydrooxazolo[3,2-d]-s-triazolo[4,3-a][1,4 benzodiazepine.

6. The compound according to claim 1, namely, 10-chloro-1-methyl-8a-phenyl-4,6,7,8a-tetrahydrooxazolo[3,2-d]-s-triazolo[4,3-a][1,4]benzodiazepine.

7. The compound according to claim 1, namely, 10-chloro-1,7-dimethyl-8a-phenyl-4,6,7,8a-tetrahydrooxazolo[3,2-d]-s-triazolo[4,3-a][1,4]benzodiazepine.

8. The compound according to claim 1, namely, 10-chloro-1-methyl-8a-phenyl-4,6,7,8a-tetrahydro-8H-imidazo[1,2-d]-s-triazolo[4,3-a][1,4]-benzodiazepine.

9. The compound according to claim 1, namely, 11-chloro-1-methyl-9a-phenyl-4,6,7,9a-tetrahydro-8H-oxazino[3,2-d]-s-triazolo[4,3-a][1,4]-benzodiazepine.

10. The compound according to claim 1, namely, 1-methyl-10-nitro-8a-phenyl-4,6,7,8a-tetrahydrooxazolo[3,2-d]-s-triazolo [4,3-a][1,4]-benzodiazepine.

11. The compound according to claim 1, namely, 10-chloro-8a-(2-chlorophenyl)-4,6,7,8a-tetrahydrooxazolo[3,2-d]-s-triazolo[4,3-a][1,4]benzodiazepine.

12. The compound according to claim 1, namely, 10-chloro-8a(2-fluorophenyl)-4,6,7,8a-tetrahydrooxazolo-[3,2-d]-s-triazolo[4,3-a][1,4]benzodiazepine.

13. The compound according to claim 1, namely, 10-chloro-8a-(4-methoxyphenyl)-4,6,7,8a-tetrahydrooxazolo[3,2-d]-s-triazolo[4,3-a][1,4]benzodiazepine.

14. The compound according to claim 1, namely, 8a-phenyl-4,6,7,8a-tetrahydrooxazolo[3,2-d]-s-triazolo[4,3-a][1,4]benzodiazepine.

15. The compound according to claim 1, namely, 8a-phenyl-10-trifluoromethyl-4,6,7,8a-tetrahydrooxazolo[3,2-d]-s-triazolo[4,3-a][1,4]benzodiazepine.

16. The compound according to claim 1, namely, 10-nitro-8a-phenyl-4,6,7,8a-tetrahydrooxazolo[3,2-d]-s-triazolo [4,3-a][1,4]benzodiazepine.

17. The compound according to claim 1, namely, 1,-10-dimethyl-8a-phenyl-4,6,7,8a-tetrahydrooxazolo[3,2-d]-s-triazolo[4,3-a][1,4]-benzodiazepine.

* * * * *

UNITED STATES PATENT OFFICE
CERTIFICATE OF CORRECTION

Patent No. 3,876,634          Dated April 8, 1975

Inventor(s) Kanji Meguro, Hiroyuki Tawada and Yutaka Kuwada

It is certified that error appears in the above-identified patent and that said Letters Patent are hereby corrected as shown below:

In the heading of the Patent, in the space provided for priority information, insert the following:

--[30] Foreign Application Priority Data

October 30, 1970   Japan ............... 45-96058

Signed and Sealed this

Twenty-eighth Day of March 1978

[SEAL]

Attest:

RUTH C. MASON
*Attesting Officer*

LUTRELLE F. PARKER
*Acting Commissioner of Patents and Trademarks*